US011027700B2

(12) United States Patent
Bambeck et al.

(10) Patent No.: US 11,027,700 B2
(45) Date of Patent: Jun. 8, 2021

(54) ACCESS CONTROLLER FOR VEHICLES, COMPRISING A SECURITY DEVICE

(71) Applicants: Daniel Bambeck, Essen (DE); Okan Salam, Essen (DE); Markus Mehlich, Duesseldorf (DE)

(72) Inventors: Daniel Bambeck, Essen (DE); Okan Salam, Essen (DE); Markus Mehlich, Duesseldorf (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/651,149

(22) PCT Filed: Sep. 7, 2018

(86) PCT No.: PCT/EP2018/074197
§ 371 (c)(1),
(2) Date: Mar. 26, 2020

(87) PCT Pub. No.: WO2019/068416
PCT Pub. Date: Apr. 11, 2019

(65) Prior Publication Data
US 2020/0290564 A1    Sep. 17, 2020

(30) Foreign Application Priority Data

Oct. 4, 2017   (DE) ..................... 10 2017 122 991.4

(51) Int. Cl.
*B60R 25/24*      (2013.01)
*B60R 25/40*      (2013.01)
(52) U.S. Cl.
CPC ............ *B60R 25/24* (2013.01); *B60R 25/406* (2013.01)

(58) Field of Classification Search
CPC ....... B60R 25/24; B60R 25/406; B60R 25/00; B60R 16/033; H04L 63/0853;
(Continued)

(56) References Cited

U.S. PATENT DOCUMENTS 8,841,987 B1      9/2014 Stanfield et al.
2008/0197987 A1*  8/2008 King ................... B60R 25/2072
                                                 340/426.36

(Continued)

FOREIGN PATENT DOCUMENTS

CN           105905041 A    8/2016
DE     10 2005 059061 A1    6/2007
(Continued)

OTHER PUBLICATIONS

International Search Report of International Application No. PCT/EP2018/074197 dated Dec. 7, 2018, 5 pages (with English translation).

(Continued)

*Primary Examiner* — Mirza F Alam
(74) *Attorney, Agent, or Firm* — Fay Sharpe LLP

(57) ABSTRACT

Access control equipment for vehicles with an electronic remote key which is accommodated in a housing, includes a controller that is designed for temporary activation of the remote key. The controller has an interface for wireless communication and is designed to cause an activation of the remote key in dependence on a wireless communication. A voltage supply is coupled to the controller and the remote key. The voltage supply, under actuation from the controller, applies an electrical breakdown voltage via at least one contact of the remote key for at least a first predetermined duration, which is greater than a designated operating voltage for the remote key, in order to destroy the remote key by the resulting current flow.

11 Claims, 1 Drawing Sheet

(58) Field of Classification Search
CPC .. G07C 2009/0019; G07C 2009/00579; E05B 81/82

See application file for complete search history.

(56) References Cited

U.S. PATENT DOCUMENTS

| | | | | |
|---|---|---|---|---|
| 2009/0179767 A1* | 7/2009 | King | ............ | B60R 25/406 340/12.22 |
| 2011/0115287 A1* | 5/2011 | Morita | ............ | B60R 16/033 307/9.1 |
| 2014/0062655 A1* | 3/2014 | Colburn | ............ | G07C 9/00896 340/5.61 |
| 2017/0026360 A1* | 1/2017 | Begdouri | ............ | H04L 63/0853 |

FOREIGN PATENT DOCUMENTS

| | | |
|---|---|---|
| DE | 10 2006 001410 A1 | 7/2007 |
| DE | 10 2013 002281 A1 | 8/2014 |
| DE | 10 2014 119287 A1 | 7/2016 |
| FR | 3043039 A1 | 5/2017 |

OTHER PUBLICATIONS

International Preliminary Report on Patentability of International Application No. PCT/EP2018/074197 dated Apr. 16, 2020, 10 pages (with English translation).

\* cited by examiner

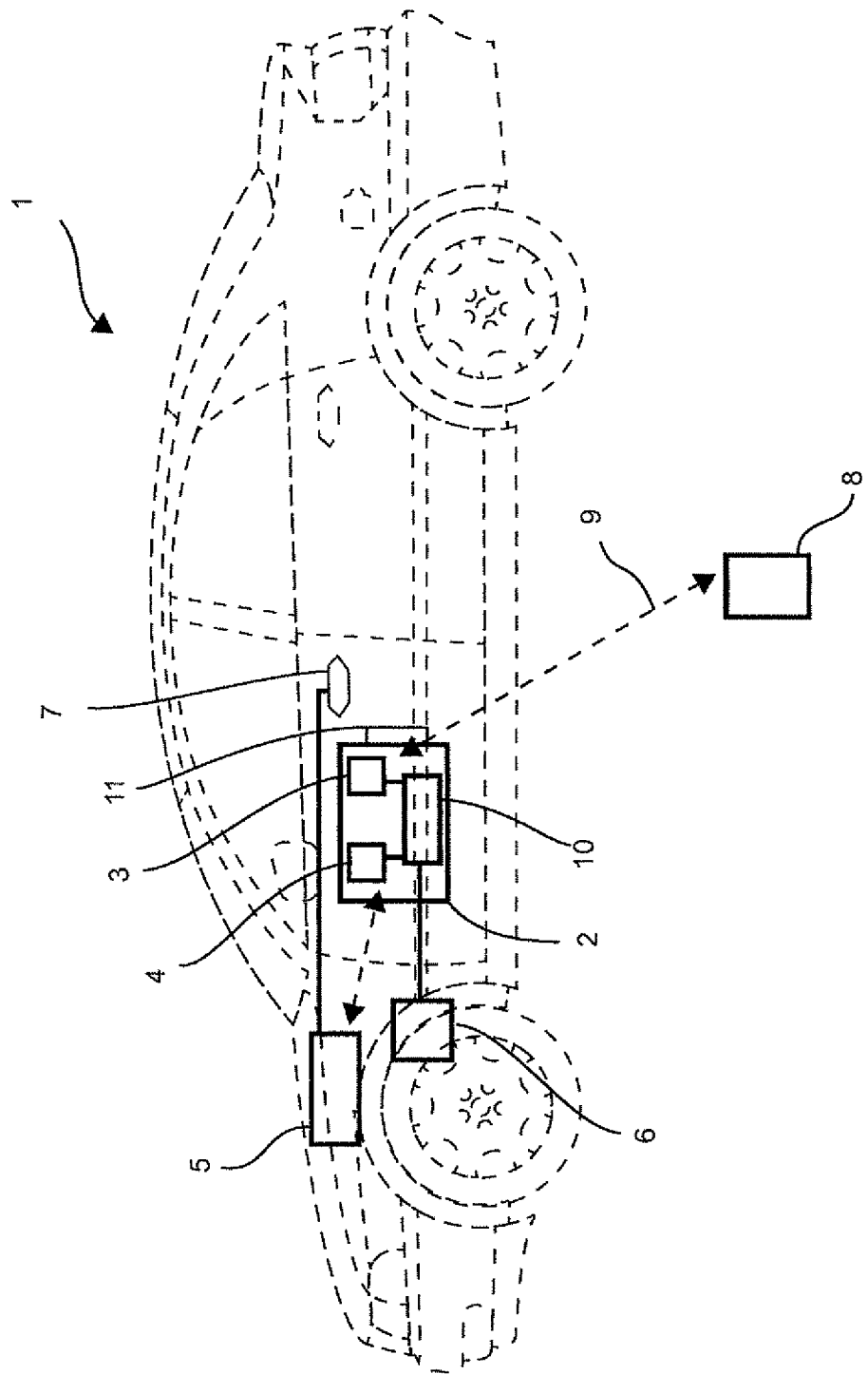

ACCESS CONTROLLER FOR VEHICLES, COMPRISING A SECURITY DEVICE

BACKGROUND

The invention relates to an access control equipment for vehicles, which has an electronic remote key contained in a housing. The remote key in turn has an electronic remote key circuit.

Remote keys for vehicles have been known for a long time and exist in different designs. So-called passive remote keys are often used, which can communicate with a vehicle without activity of the key in order to allow access to the vehicle or certain vehicle functions.

The generic access control equipment is equipped with a remote key and is intended for arrangement in a vehicle. The access control equipment has a controller which is designed to activate the remote key temporarily. This controller has an interface for wireless communication and is designed to activate the remote key in dependence on a wireless communication.

This kind of equipment is particularly well known in car sharing systems or car rental systems. The remote key belonging to the vehicle is placed and left in the vehicle. This is necessary to ensure communication between the vehicle and the key, especially in the case of passive systems, and to allow the movement of the vehicle. In this way, vehicle manufacturers can utilize conventional production vehicles for the usage as car-sharing or rental vehicles, since the key remains permanently in the vehicle and the presence of the key expected by the vehicle system during operation is guaranteed at all times. A user gains access to the vehicle via communication with the controller, as the controller decides whether the remote key is activated in dependence of the user's legitimation or not.

A corresponding system is disclosed, for example, in DE10 2013 002 281 A1. With this system, for example, it is intended that a vehicle is prepared for rental and a vehicle remote control key is present in the vehicle. A user receives a release code from the vehicle's manager (e.g. the car sharing provider or car rental supplier) which is transmitted to his or her portable mobile device, e.g. smartphone. The user couples his smartphone to the controller via a Bluetooth connection, and if the user's authorization is successful, the controller releases the vehicle's access to the remote key, for example by activating the remote key.

One problem with such systems is that the user can take possession of the remote control key, as can a third party who illegally gains entry to the vehicle.

The object of the invention is to design an access control equipment for vehicles with increased security.

BRIEF SUMMARY

The object is solved by an access control equipment for vehicles with the features of claim 1.

According to the invention, the generic access control equipment is designed with a voltage supply coupled to the controller and the remote key. The voltage supply can be contained in the same housing as the remote key, but this is not necessary. In any case, the voltage supply is subject to control by the controller. According to the invention, the voltage supply is in fact capable, under the actuation of the controller, of applying an electrical breakdown voltage for at least a first predetermined duration via at least one contacting of the electronic remote key circuit, which is greater than a designated operating voltage of the electronic remote key circuit. This is done to irreversibly destroy the electronic remote key circuit by the resulting current flow.

Thus, the access control equipment according to the invention provides for the destruction of the remote key, more precisely of the electronic remote key circuit included in the remote key, under a control access of the controller. This is to ensure that in the event, in which it can be inferred from external circumstances, that unauthorized access to the remote key is taking place, a quick destruction of the remote key can be caused. The trigger of such a destruction can be initiated by a control command to the controller, but the controller can also receive signals from the vehicle system, for example, indicating an intrusion into the vehicle or have separate sensor means to report unauthorized access to the remote keys.

It has been shown that the destruction of a remote key by excessive voltage is reliable and reproducible. The destruction voltage should, depending on the sensitivity of the electronic remote key circuit, be significantly higher than the operating voltage shown and is regularly one to two magnitudes higher. The voltage supply can draw the required electrical energy from the vehicle's electrical system or have its own storage means in order to be able to carry out the destruction independently of the vehicle's electrical system.

Which duration and which destruction voltage is to be selected depends on the one hand on the type of contacting of the electronic remote key circuit, i.e. to which components the contacting is applied, and on the other hand on any security related requirements. For example, at voltages up to 60 V DC, protection against touching can usually be dispensed with, as these are low voltages that are considered harmless to humans and animals. It is easy to determine, for specific electronic remote key circuits, which duration of a corresponding voltage system is sufficient to initiate a destruction of the remote key.

After the remote key is destroyed, a proper operation of the vehicle can no longer take place because the communication between the remote key and the vehicle is permanently interrupted. The vehicle has been shut down accordingly.

In a particularly preferred design of the invention, a plurality of electrical voltage pulses is applied to the electronic remote key circuit under the actuation of the controller. This is done via the contacting of the electronic remote key circuit and the voltage pulses exceed in each case at least temporarily the destruction voltage and are separated by pauses with lower electrical voltage or even disappearing electrical voltage.

It has been shown that multiple admissions of the electronic remote key circuits with a sequence of voltage pulses leads to a particularly reliable destruction of the electronic circuit. Trials have shown that this type of destruction by current flow is superior to the applying of a single voltage pulse, even over a longer duration.

For this purpose, the voltage supply can, for example, have electrical storage means, such as capacitors, which are charged in the pauses between the pulses and are quickly discharged for the delivery of the voltage pulses.

The sequence of voltage pulses can be emitted in a short time, for example at intervals of a few milliseconds, so that the destruction of the remote key with the electronic remote key circuit contained therein takes place within a few tenths of a second after actuation by the controller.

It is preferred if at least one contacting of the electronic remote key circuit is arranged to a battery contact of the electronic remote key circuit.

The advantage of this design is that supply voltage can be applied via the battery contact for correct operation and activation of the remote key, as well as a destruction, takes place via one and the same contact that is intended for supply during operation. In this way, the number of contacts between the voltage supply and the electronic remote key circuit can be reduced.

It is furthermore particularly advantageous if the voltage supply is intended both for the supply of the electronic remote key circuit with the designated operating voltage and for the destruction of the remote key circuit after actuation by the controller. In this case, the voltage supply is thus designed for the delivery of different voltages at different voltage levels or the output of voltage pulses. The voltage supply only switches into a destructive voltage output under actuation of the controller and is otherwise intended to output the operating voltage of the remote key. The output of the operating voltage can in turn be carried out in dependence on the controller, e.g. to switch off the remote key completely at times.

In a preferred embodiment of the invention, the destruction voltage is chosen to be greater than 30 V, but less than 100 V, in particular less than 60 V.

The application of a voltage in the range between 30 V and 100 V has proven to be reliably destructive, depending on the duration of the applied voltage and possibly the number of voltage pulses. The use of a voltage lower than 60 V is favorable with regard to compliance with security requirements, as already mentioned above, as these are considered low voltages that are also harmless to animals and children. Accordingly, the choice of a voltage between 50 V and 60 V is seen as particularly suitable for the quick and reliable destruction of the remote key circuit.

It is of particular advantage if the voltage supply has at least one capacitor which is charged to the breakdown voltage and can be coupled to the electronic remote key circuit under control of the controller. The use of a capacitor that can deliver the breakdown voltages or voltage pulses is a robust and reliable construction. Here, the capacitor can be charged via a simple circuit, possibly with a circuit to voltage increase and discharges after actuation by the control circuit by introduction of a breakdown voltage via the remote key circuit. It may also be provided that an electrical buffer storage for the voltage supply and the control circuit is provided to guarantee the destruction of the key also in case of an interruption of the connection to the vehicle electrical system.

In a further development of the invention, the controller is designed with sensor means for the supervision of the housing, which holds the remote key. The controller controls the destruction of the electronic remote key circuit by actuation of the voltage supply, in dependence on signals from the sensor means. In this design it is assumed that upon reporting an access to the housing, the capture by the sensor means takes place, and as a result the destruction of the remote key is indicated. In particular, the sensor means can be mechanical sensors that supervise a proper closure of the housing (e.g. microswitches which contact the lid of a housing) or, for example, vibration or light detectors which detect an aperture of the housing. Pressure sensors or all sensors known from alarm technology can also be used for the supervision of a closed area. Furthermore, the sensors of the vehicle coupled with an alarm system of the vehicle can be used, provided that the controller can be coupled with a signal system of the vehicle.

It can be provided that the controller is controllable by wireless means to defuse the destruction function, especially if the key is to be used for maintenance accesses or for a conversion of the vehicle from a car sharing vehicle or rental vehicle to a regular vehicle.

In another design of the invention, the controller is designed in such a way that, in dependence on data received via the interface for wireless communication, it triggers a destruction of the electronic remote key circuit by actuation of the voltage supply.

In particular it may be provided that the controller has an interface for communication via wireless communication networks, in particular mobile networks. If a stealing of a vehicle is reported, the command for the destruction of the remote key can be sent to the controller via such a communication network in order to reduce the range of the vehicle.

BRIEF DESCRIPTION OF THE DRAWINGS

The invention will now be explained in more detail with reference to the accompanying drawings.

FIG. 1 shows schematically the arrangement of the components essential to the invention in a motor vehicle.

DETAILED DESCRIPTION

FIG. 1 shows a motor vehicle 1. A passive entry system is built into the vehicle, with a central controller 5 provided on the vehicle side. This central controller 5 can enter into communication connection with a mobile remote key.

For this purpose, the central controller 5 is coupled to a door handle 7 with sensors for the factory-provided operation. If door handle 7 is operated or sensors on door handle 7 register an approach, a signal is transferred to the central controller 5 and a retrieval of the remote key takes place to check the legitimation of access to the vehicle.

In the present example, however, it is the application of the invention, wherein the remote key 4 is permanently accommodated in a housing 2 in the vehicle. A user therefore has no access to the remote key 4 but approaches the vehicle with a mobile communication device 8. The central controller of the vehicle 5 is not designed to communicate with the mobile communication device 8. However, a controller 3 is contained in the housing 2 together with the vehicle key 4 and is designed for Bluetooth communication 9 with the mobile communication device 8. For the access to the vehicle, a user of the mobile communication device 8 accordingly receives an access code or electronic access token via a communication connection to his mobile device 8, which transmits it to the controller 3 via the Bluetooth connection 9. If the verification of the key data set is successful, the controller 3 controls the remote key 4 for activation. The remote control key 4 can then enter into communication connection with the central controller 5 of the vehicle and enable the unlocking and start release of the vehicle. In this embodiment, a central energy supply 6 is arranged externally to the housing 2. This supplies the controller 3 and a voltage supply 10 via a line connection in housing 2. In this example, the voltage supply 10 supplies both the controller 3 and the vehicle key 4 with the respective operating voltage. During normal operation, it remains at this supply with the normal operating voltage, wherein the voltage supply 10, under the control of the controller 3, can temporarily interrupt the supply to the vehicle key 4 to shut it down.

If illegal access to the housing 2 is detected, for example via sensor equipment 11 which monitors an aperture of the housing 2, the controller 3 gives a control instruction to the voltage supply 10 which applies a sequence of breakdown voltage pulses to the supply terminals of the vehicle key 4. The vehicle key 4 is destroyed by this sequence of voltage pulses and the resulting current flows through the electronic components. Even if a user illegally gains access via the aperture of housing 2, he will only have access to a destroyed key 4. The voltage pulses can be suitably matched to key 4, for example including a sequence of 5 to 10 voltage pulses of 60 V each by capacitor discharge at intervals of several milliseconds. This procedure causes that, in spite of an illegal possession of the key 4, no theft of the vehicle is possible, because the corresponding key 4 is destroyed.

The invention claimed is:

1. Access control equipment for vehicles, with an electronic remote key which is accommodated in a housing, said remote key being the key belonging to the vehicle, wherein said remote key is placed and left in the vehicle in order to allow for the utilization of conventional production vehicles for use as car-sharing or rental vehicles, and wherein because the remote key remains permanently in the vehicle and the presence of the remote key is expected by the vehicle system during operation, such operation is guaranteed at all times, the access control equipment comprising:
   a controller which is designed for temporary activation of the remote key, the controller having an interface for wireless communication and being designed to cause an activation of the remote key in dependence on a wireless communication,
   wherein
   a voltage supply is coupled to the controller and the remote key, wherein the voltage supply, under actuation from the controller, applies an electrical breakdown voltage via at least one contact of the remote key for at least a first predetermined duration, which is greater than a designated operating voltage of the remote key, in order to destroy the remote key by the resulting current flow.

2. The access control equipment according to claim 1, wherein the voltage supply, under actuation from the controller, applies a plurality of electrical voltage pulses via the at least one contact of the remote key, wherein the voltage pulses each at least temporarily exceed the breakdown voltage and are separated by pauses in which a lower electrical voltage is applied to the at least one contact of the remote key.

3. The access control equipment according to claim 1, wherein the at least one contact of the remote key is arranged at a battery contact of the remote key.

4. The access control equipment according to claim 1, wherein the voltage supply is also designed for the supply of the remote key with the designated operating voltage.

5. The access control equipment according to claim 1, wherein the breakdown voltage is greater than 30 V and less than 100 V.

6. The access control equipment according to claim 1, wherein the voltage supply has at least one capacitor which is charged to the breakdown voltage and can be coupled to the remote key under control of the controller.

7. The access control equipment according to claim 1, wherein the controller is designed with sensor means for the supervision of the housing which receives the remote key, wherein the controller triggers the destruction of the remote key in dependence on the signals of the sensor means by actuation of the voltage supply.

8. The access control equipment according to claim 7, wherein the sensor means are designed to capture a mechanical aperture of the housing.

9. The access control equipment according to claim 1, wherein the controller, in dependence on data received via the interface for wireless communication, initiates the destruction of the remote key by actuation of the power supply.

10. The access control equipment according to claim 1, wherein an electrical buffer storage is coupled to the voltage supply and the controller and is accommodated in the housing, which provides an amount of electrical energy to cause the destruction of the key without further external feed of the voltage supply.

11. The access control equipment according to claim 5, wherein the breakdown voltage is less than 60 V.

* * * * *